US007024023B2

(12) United States Patent
Arnouse

(10) Patent No.: US 7,024,023 B2
(45) Date of Patent: Apr. 4, 2006

(54) APPARATUS, SYSTEM AND METHOD FOR AIRCRAFT SECURITY

(76) Inventor: Michael Arnouse, 15 Hickory Dr., Old Brookville, NY (US) 11545

( * ) Notice: Subject to any disclaimer, the term of this patent is extended or adjusted under 35 U.S.C. 154(b) by 0 days.

(21) Appl. No.: 10/643,101

(22) Filed: Aug. 18, 2003

(65) Prior Publication Data

US 2004/0264743 A1   Dec. 30, 2004

Related U.S. Application Data

(60) Provisional application No. 60/482,807, filed on Jun. 26, 2003.

(51) Int. Cl.
*G06K 9/00* (2006.01)
(52) U.S. Cl. .................. 382/116; 340/5.53; 340/945
(58) Field of Classification Search ............. 382/115, 382/117, 124; 235/380, 492; 340/5.61, 340/5.52, 5.53, 945; 283/68; 356/71; 703/1, 703/26, 42; 902/3, 4, 25; 704/246, 273; 701/2, 10, 11
See application file for complete search history.

(56) References Cited

U.S. PATENT DOCUMENTS

| | | | | |
|---|---|---|---|---|
| 4,107,775 A | * | 8/1978 | Ott ........................... 382/115 |
| 5,548,660 A | * | 8/1996 | Lemelson ................... 382/116 |
| 5,719,950 A | | 2/1998 | Osten et al. ................ 382/115 |
| 6,100,811 A | | 8/2000 | Hsu et al. ................... 340/5.83 |
| 6,111,977 A | | 8/2000 | Scott et al. ................. 382/124 |
| 6,119,096 A | | 9/2000 | Mann et al. ................... 705/5 |
| 6,167,333 A | * | 12/2000 | Gehlot ......................... 701/35 |
| 6,219,439 B1 | | 4/2001 | Burger ....................... 382/115 |
| 6,421,943 B1 | | 7/2002 | Caulfield et al. .......... 42/70.11 |
| 6,442,465 B1 | | 8/2002 | Breed et al. ................. 701/45 |
| 6,498,970 B1 | | 12/2002 | Colmenarez et al. ........ 701/36 |
| 6,559,769 B1 | | 5/2003 | Anthony et al. ............ 340/574 |
| 6,572,014 B1 | * | 6/2003 | Lambert ..................... 235/380 |
| 6,696,979 B1 | * | 2/2004 | Manten et al. .............. 340/945 |
| 2003/0067379 A1 | * | 4/2003 | Riley ......................... 340/5.53 |
| 2003/0071743 A1 | * | 4/2003 | Seah et al. .................. 340/945 |
| 2004/0107028 A1 | * | 6/2004 | Catalano ....................... 701/2 |

* cited by examiner

*Primary Examiner*—Samir Ahmed
(74) *Attorney, Agent, or Firm*—DLA Piper Rudnick Gray Cary US LLP

(57) ABSTRACT

A security mechanism identifies users, so as to restrict operation to authorized users, such as to persons authorized to fly a given aircraft. The security mechanism comprises a controller operable by a user; one or more security devices to identify the user attempting to operate the controller; and one or more monitoring devices to determine whether or not the user identified is authorized to operate the controller.

70 Claims, 3 Drawing Sheets

APPARATUS, SYSTEM AND METHOD FOR AIRCRAFT SECURITY

CROSS REFERENCE TO RELATED APPLICATIONS

The present application claims priority from U.S. Provisional Patent Application Ser. No. 60/482,807 filed Jun. 26, 2003, the entire disclosure of which is incorporated by reference herein.

FIELD OF THE INVENTION

The present invention relates generally to security mechanisms and more particularly to aircraft security mechanisms.

BACKGROUND OF THE INVENTION

The airline industry has, for over half a century, transported large volumes of travelers on a daily basis to destinations around the world. One of the primary concerns of the airline industry during this time period has been to maintain the safety of its passengers and aircraft. Over time, the general public, and most airline passengers, developed a positive feeling for airline safety. Statistically speaking, air travel has been considered safer than other presumably safe activities; for example, routinely there have been more people involved in auto or gun related accidents or fires than people involved in aircraft related accidents. The occasional hijacking was not considered a major threat, as most ended without passenger casualties or damage to aircraft.

The attitude toward air travel forever changed on the morning of Sep. 11, 2001, when the World Trade Center in New York, N.Y. and the Pentagon in Washington, D.C. became the objects of a terrorist attack of previously unimaginable proportions. On that day, hijackers took over control of four separate aircraft and then managed to personally fly three of those as weapons of mass murder into the buildings, destroying the buildings, surrounding buildings and all three aircraft. The fourth plane crashed into an open field just outside of Pittsburgh following a valiant struggle by passengers to recapture the plane. Tragically, all passengers on all four planes and several thousand people on the ground died that day.

Following the aftermath of "911", there is now a greater emphasis than ever before on improving airline security to try to prevent hijacking of aircraft. Much of the efforts have been directed to reducing the chances that a successful hijacking may occur, such as by instituting more stringent searches at check-in, by placing armed marshal on flights and by better securing the door separating the passenger and cockpit areas of the plane. These efforts, however, have done little to address the source of the problem, which is hijackers taking over control of an aircraft.

In view of which, there is seen a need to improve the manner by which the occurrences of hijacking on aircraft can be reduced.

SUMMARY OF THE INVENTION

In accordance with the present invention, an embodiment comprises a security mechanism for identifying individuals, so as to restrict operation to only those authorized, such as to persons authorized to fly a given aircraft. The security mechanism comprises a controller operable by a user; one or more security devices to identify the user attempting to operate the controller; and one or more monitoring devices to determine whether or not the user identified is authorized to operate the controller.

DESCRIPTION OF THE INVENTION

Figure 1:
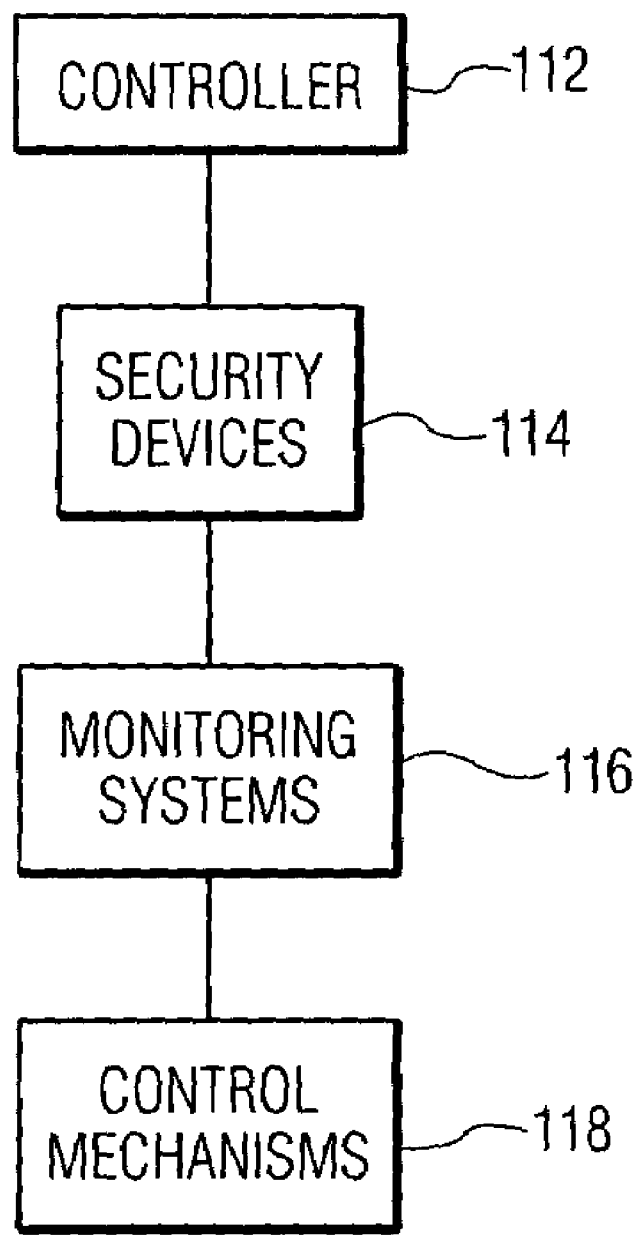
FIG. 1 is a block diagram of an embodiment of a security system in accordance with the present invention.

In accordance with embodiments of the present invention, an apparatus, system and method is disclosed for restricting the operation of an aircraft, vehicle or other device or system to only authorized personnel. In general, as shown in FIG. 1, for this purpose a controller 112 is provided operable by a user, one or more security devices 114, such as biometric readers, is provided associated with the controller 112, one or more monitoring systems 116, such as a computer, is provided in communication with the security devices 114 and one or more control mechanisms 118 is provided in communication with the monitoring systems 116. Any desired biometric characteristics may be utilized for this purpose, such as, for example, fingerprint, retina, facial or DNA characteristics. The one or more biometric readers 114 may be utilized in a variety of different manners, such as being mounted on or integrated within the controller 112 or may be a separate device. The following illustrates exemplary embodiments adapted for aircraft use, such as airplanes or helicopters.

Figure 2:
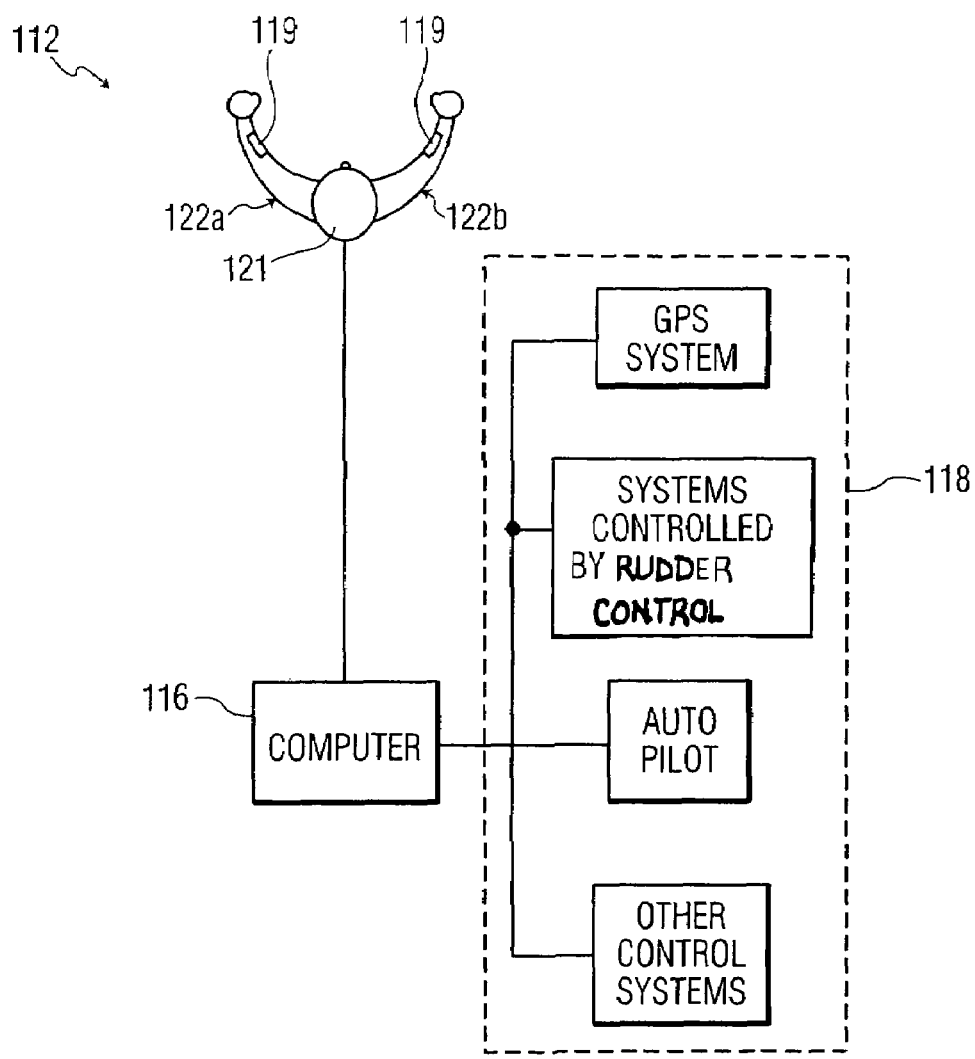
FIG. 2 is a partial schematic, partial block diagram of the system of FIG. 1.
Figure 3:
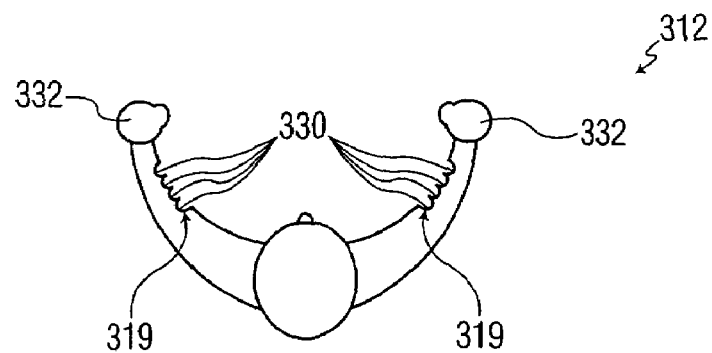
FIG. 3 is a further exemplary embodiment of a rudder control of FIG. 2.

FIG. 2 is a perspective view of an embodiment in which biometric readers in the form of fingerprint and retina readers 119 and 121, respectively, are associated with the rudder control 112, i.e., the controller, of an aircraft. In one preferred embodiment, the fingerprint reader 119 is of a type that also incorporates a pulse sensor. In the embodiment shown, the fingerprint/pulse reader 119 may be provided on one or both of the rudder control arms 122a and 122b. The retina reader 121 is shown provided centrally disposed between the two upright rudder control arms 122a/122b. As should be understood, the fingerprint/pulse reader 119 and retina reader 121 may be utilized at other desired locations as well, such as the fingerprint/pulse reader 119 being associated with other components or the retina reader 121 mounted at other locations in the cockpit. The fingerprint/pulse reader 119 and retina reader 121 may be conventional devices, such as any commercially available components, or may be specially manufactured hardware and/or software where desired. Alternatively, as should be understood, other types of biometric sensors may be utilized where desired. In FIG. 3 is illustrated another exemplary embodiment of a rudder control 312. In this embodiment, the fingerprint/pulse reader 319 comprises a series of four inward radius portions 330 shaped to accommodate a user's fingers and a thumb reader 332. The remaining portions are the same as that illustrated in FIG. 2. As should be understood, the rudder control may comprise other shapes and configurations as well, and should not be construed as being limited to the designs shown in FIGS. 2 and 3; for example, a single straight arm, circular steering wheel type design, T-shaped, etc.

In addition, preferably the one or more monitoring systems 116, such as a computer illustrated in FIG. 2, is provided in communication with the fingerprint/pulse reader 119 and retina reader 121. The term "computer" as used herein should be broadly construed to comprise any device capable of receiving, transmitting, and/or using information, including, without limitation, a processor, a microprocessor, a personal computer, a network server, a distributed computing system involving parallel processes over a network, network computing or a mainframe.

As discussed above, the monitoring system 116 is also preferably in communication with one or more control mechanisms 118 on the aircraft, such as, for example, the rudder control 112, any system controlled by the rudder control 112, the auto pilot control system, a Global Positioning System ("GPS"), such as a GPS chip, located on the aircraft and/or integrated within one or more biometric sensors, or any conventional systems on the aircraft, as examples. The monitoring system 116 may comprise the aircraft's existing on board computer system or may comprise a separate computer system located on the aircraft itself or at designated locations outside of the aircraft, such as an air traffic control center, which is in communication with the on board computer system or directly with the aircraft's security devices 114 and/or control mechanisms 118.

In addition, the monitoring system 116 may be programmed, such as by authorized personnel, so as to be responsive to data received from the fingerprint/pulse reader 119 and/or retina reader 121 in order to control specific operations of the aircraft, such as designated ones of the aircraft's control mechanisms 118. In some exemplary embodiments, the monitoring system 116 may be preprogrammed so as to grant designated personnel permission to operate the aircraft for specific tasks; for example, granting only the designated pilot and copilot of a certain flight the ability to fly the aircraft, granting designated crew the ability to turn off and/or on the aircraft beacon system, granting designated ground crew and maintenance personnel the ability to service the aircraft, etc. In this manner, different types of permissions may be granted where desired to different categories of personnel. Biometric sensors may be utilized wherever restrictions may be desired to operate the aircraft; for instance, biometric verification required to fly the aircraft, for operation of the beacon control system or for access into designated areas, for example, via a biometric interlock on doors, panels and/or hatches providing access to any area on the aircraft potentially vulnerable to sabotage, such as, for example, providing access onto the aircraft itself, into cockpit areas and/or for access to storage compartments, such as cargo areas underneath the aircraft, etc. In this and other embodiments, the GPS system may operate by sending positioning information to designated locations, such as ground control, in response to various occurrences on the aircraft, such as, for example, where unauthorized persons attempt to fly the plane, a plane goes off its normal course, etc. An exemplary application of this embodiment is illustrated in the accompanying flow chart of FIG. 4, which is described in greater detail below.

Figure 4:
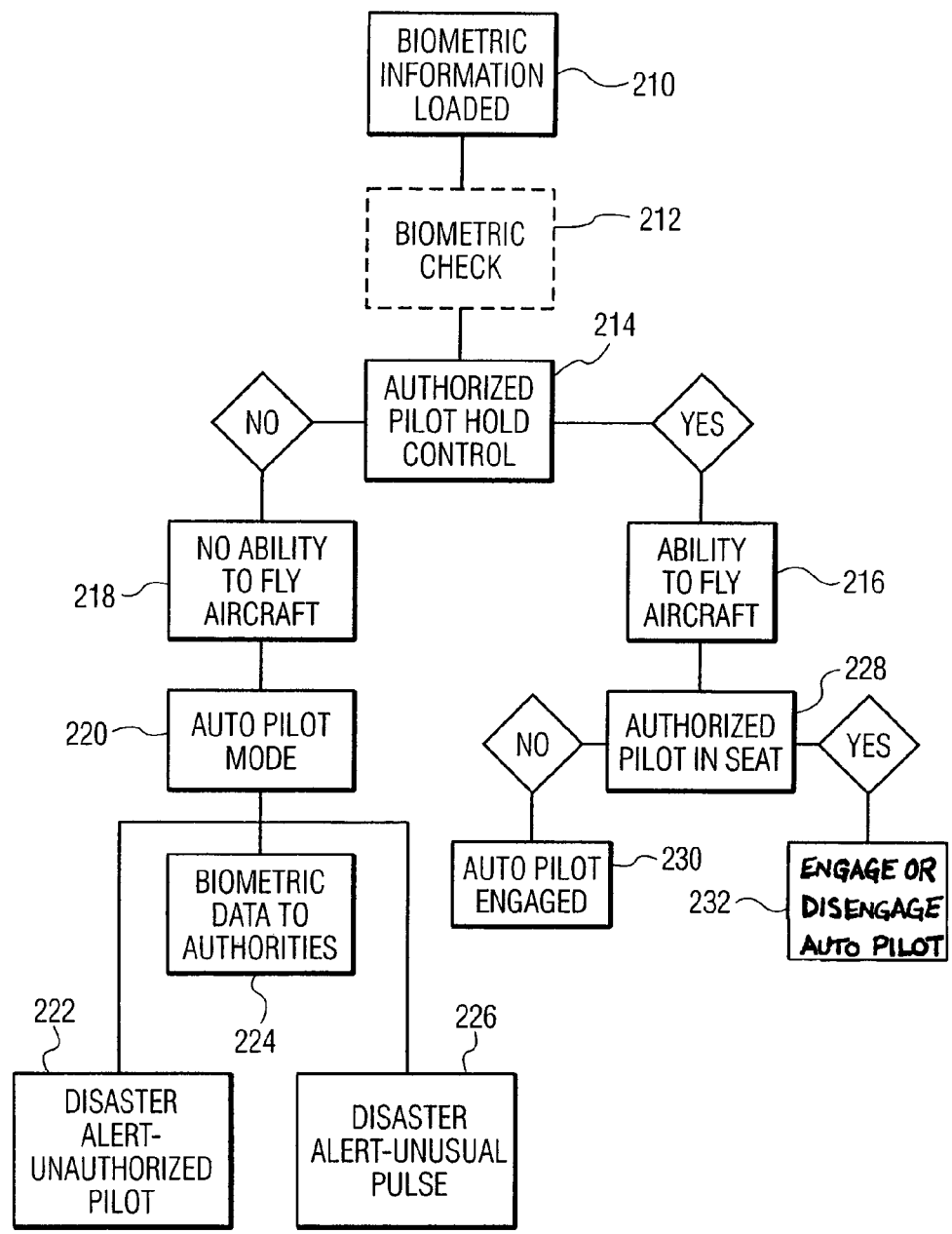
FIG. 4 is a block diagram of an exemplary application of the system of FIG. 1.

As shown at step 210 in FIG. 4, prior to flight, the pilots and crew that are pre-authorized have their fingerprint and retina biometric information loaded into the designated monitoring system 116, such as the airplane's on-board computer. As mentioned above, a separate computer system located on or outside of the aircraft may be utilized as well. The biometric data that is loaded may have been previously taken from the individuals and stored in a database in electronic form, which is then transferred to the plane computer. Alternatively, the biometric data to be loaded may be read from these individuals on site, such as at the time boarding occurs, and then loaded into the on-board computer system at that time. In addition, where desired, a separate biometric check may be performed to verify identity, such as taken from the pilots and crew prior to boarding the plane, such as a fingerprint check that may be compared against stored biometric data for the designated persons, as shown in dotted lines at step 212.

As shown at step 214, the pilot is required to hold the rudder control 112, so that the pilot's fingerprint/pulse can be detected by the fingerprint/pulse reader 119 and communicated to the monitoring system 116 to verify identity. An authorized pilot will be able to fly the aircraft, as shown at step 216. Otherwise, as shown at step 218, the rudder control 112 will not function properly and the individual will not be able to fly the plane; for example, in one embodiment, the monitoring system 116 will kick back to auto-pilot mode, as shown at step 220. The term "fly" as used herein should be broadly construed to refer to any phase of an aircraft flight, starting up of the aircraft, movement of the aircraft from a fixed position, take-off or landing of the aircraft, taxiing of the aircraft as well as in the air flight. Accordingly, in other exemplary embodiments, where the aircraft is on the ground, for instance, the monitoring system 116 may operate to prohibit takeoff where an unauthorized pilot is detected, for example, by failing to turn on engines, locking of the rudder control 112, etc. Further, where an unauthorized person may place their hand on the rudder control 112 in order to try to fly the airplane, the monitoring system 116 may also communicate that information to designated authorities, such as, for example, via an unauthorized pilot notification or a disaster alert signal sent to ground control, as shown at step 222. The monitoring system 116 may also at the same time send the unauthorized person's biometric data to designated authorities, as shown at step 224, so that a subsequent biometric check may be performed to uncover the identity of that individual. In this embodiment, the pulse sensor of the fingerprint/pulse reader 119 operates to detect further information about the condition of the individual holding the rudder control 112, such as whether or not there is the presence of a pulse, to signify that the hand placed on the rudder control is of a live individual, or if there is a rapid or irregular pulse, such as to signify that the individual is in a distressed state. The monitoring system 116 can be programmed to notify authorities, such as ground control, if any such unusual pulse reading occurs, such as, for example, via a distressed pilot notification or a disaster alert, as shown at step 226.

In addition, the retina reader 121 can also be used in this embodiment as an additional level of security, such as to communicate with the monitoring system 116 so as to authorize engagement or disengagement of the auto-pilot. For example, the retina reader 121 can verify whether an authorized pilot is in his or her seat, and control subsequent operations based that information, where desired, such as to allow disengagement of the auto-pilot, as shown at steps 228–232. Other suitable types of biometric devices may be utilized as well where desired in place of the retina reader 121; for example, a heat signature device or a camera located in the seat of the pilot rather than a retina reader. In certain embodiments, retina reader 121 can comprise one or more commercially available cameras adapted for taking a biometric read of the retina of designated persons at specified times. For example, the camera can of a type activated to take a biometric read anytime there is motion sensed. For instance, the camera can be mounted in the cockpit area and operated to take a retina read anytime there is movement by the pilot. In addition, that same camera, or another camera, can be provided to take a photograph of the designated person at the same time a retina read is taken. Multiple cameras may also be used where desired, such as for the pilot and copilot, etc. In addition, in this and other embodiments, the camera can also be activated so as to take a photograph of the designated persons at other desired times, such as when an unauthorized person attempts to take the controller or access particular areas, an irregular pulse is detected or any other distressed condition is detected. The photograph, along with any other desired information, may then be transmitted to desired locations, such as via satellite, cellular or independent transmitter, as examples. Some examples of the desired locations include, but area not limited to, the airlines, as mentioned above, the Department of Defense and/or Department of Homeland Security.

In some embodiments, it may be desired to grant permission to certain additional persons as a matter of course or in emergency situations to have limited or full authority to operate the aircraft who originally did not have that authority. For instance, in certain circumstances, for example, such as where any crew become ill or incapacitated during a flight, it may be desired that authority to operate a given aircraft be granted to additional persons, such as any off duty crew or any passenger pilots on the aircraft. In such situations, a biometric check can be implemented to verify identity of the additional persons before any authority to operate the aircraft will be given. The biometric check can be performed on the aircraft and compared against stored biometric information contained either on the aircraft, such as contained in the on-board computer, or any database located outside of the aircraft, such as a database kept by designated authorities, such as by individual airlines, the airline industry or a central reporting database, as examples. The biometric check can be done by utilizing a separate biometric device on the aircraft, or by using any of the existing biometric devices mentioned above, such as the fingerprint/pulse reader 119 and/or retina reader 121.

As should be understood, the embodiments discussed above can be susceptible to many different modifications or variations. For example, it should be understood that any number of security devices may be used in connection with embodiments of the present invention, and with any number being biometric readers. For instance, in the illustrated embodiment, one or more biometric readers may be utilized where desired, and the biometric readers may be of any desired type, such as a fingerprint/pulse reader and/or retina reader as shown or any other desired types of biometric reading devices. In addition, in certain embodiments, it may be desired that there be a combination of biometric and nonbiometric type security devices, or that no biometric type security devices be used. In addition, the term "controller" as used herein should be broadly construed to compnse any suitable type of device, system or method for regulating operation, such as a rudder control of any desired shape, as mentioned above, a keyboard, trigger, buttons, tracking ball, single or dual joystick, lever, wheel, etc. Further, while the illustrated embodiment is described in relation to aircraft, it should be understood that embodiments may also comprise other types of apparatus or systems as well, including vehicles, such as, for example, military vehicles, commercial vehicles (e.g., trains, buses, trucks, taxi cabs, etc), private vehicles (e.g. passenger cars), or any desired products or equipment, such as controls for nuclear reactors or military weapons, computer terminals, firearms, etc. The embodiments of the present invention may be implemented using hardware or software or any combination of the two where desired. Various embodiments may also be implemented using commercially available technology. Accordingly, it is intended that the invention not be limited to the specific illustrative embodiments, but be interpreted within the full spirit and scope of the appended claims and their equivalents.

The invention claimed is:

1. A security mechanism for identifying authorized users and reacting to detection of unauthorized users during all phases of an aircraft flight, the system comprising:
   a controller operable by a user;
   a security device to read information associated with the user attempting to operate the controller, the security device being located so as to be able to read the information at any time while the user is attempting to operate the controller; and
   one or more monitoring devices storing information as to all users authorized to operate the controller and comparing the information of the user attempting to operate the controller against the stored information as to all authorized users to determine whether the user is authorized to operate the controller, the stored information having been loaded into the monitoring device prior to flight;
   the one or more monitoring devices being operable to disable the controller and engage an autopilot if an unauthorized user is detected at the controller at any time during all phases of an aircraft flight, comprising starting up of the aircraft, movement of the aircraft from a fixed position, take-off or landing of the aircraft, taxiing of the aircraft as well as in the air flight.

2. A security mechanism of claim 1, wherein the security device comprises at least one biometric device.

3. A security mechanism of claim 2, wherein the at least one biometric device comprises a fingerprint/pulse reader on the controller.

4. A security mechanism of claim 3, wherein the at least one biometric device further comprises a retina reader on the controller.

5. A security mechanism of claim 1, wherein the controller comprises a control manually operable by a pilot to fly an aircraft.

6. A security mechanism of claim 1, wherein the one or more monitoring devices comprises at least one computer and the security device comprises at least one biometric device, with the at least one biometric device reading a characteristic of the user that is compared against biometric information stored in the at least one computer.

7. A security mechanism of claim 6, further comprising one or mote control mechanisms in communication with the one or more monitoring devices, with the one or more monitoring devices regulating the one or more control mechanisms to restrict operation based on whether or not the user is authorized to operate the controller.

8. A security system for restricting operation of an aircraft during all phases of flight comprising:
   two or mare biometric devices of different types for reading biometric information of a person at a rudder control attempting to operate the aircraft the two or more biometric devices being located so as to be able to read the information at any time during all phases of flight;
   one or more monitoring systems in communication with the two or more biometric devices, the one or more monitoring systems storing biometric information concerning all persons authorized to operate the aircraft and receiving the biometric information read by the two or more biometric devices, the one or more monitoring systems further comparing the biometric information read by the two or more biometric devices against the stored biometric information concerning all authorized persons to operate the aircraft; and one or more control mechanisms in communication with the one or more monitoring systems to regulate operation of the aircraft based on whether or not an authorized person has been identified during all phases of an aircraft flight, comprising starting up of the aircraft, movement of the aircraft from a fixed position, take-off or landing of the aircraft, taxiing of the aircraft as well as in the air flight.

9. A security system of claim 8, wherein the one or more biometric devices comprises a fingerprint reader on at least one of a control of the aircraft, an access door to the cockpit area, or an access door to a storage compartment.

10. A security system of claim 9, wherein the one or more biometric devices comprises a pulse reader on at least one of a control of the aircraft, an access door to the cockpit area, or an access door to a storage compartment.

11. A security system of claim 10, wherein the one or more biometric devices comprises a retina reader mounted in the cockpit area or on the control of the aircraft.

12. A security system of claim 8, wherein the one or more monitoring systems comprises at least one computer and the one or more biometric devices comprises at least one of a fingerprint reader, a pulse reader or a retina reader.

13. A security system of claim 12, wherein the one or more control mechanisms comprises at least one of an auto pilot control system, a control, an aircraft beacon system, a GPS system or any other system controlled by a control.

14. A method for regulating operation of an aircraft during all phases of flight comprising:
prior to each flight, loading biometric information electronically regarding all persons of a designated flight authorized to operate the aircraft;
receiving biometric information read by one or more biometric devices from any person attempting to operate the aircraft at any time during all phases of flight;
comparing the received biometric information against the biometric information that was loaded prior to flight to determine whether the person attempting to operate the aircraft at any time during all phases of flight is authorized to operate the aircraft, wherein during all phases of flight comprises the phases of starting up of the aircraft, movement of the aircraft from a flexed position, take-off or landing of the aircraft, taxiing of the aircraft as well as in the air flight; and
allowing authorized persons to operate the aircraft.

15. The method of claim 14 further comprising performing a biometric check of persons authorized to operate the aircraft prior to flight.

16. The method of claim 14, wherein operating comprises at least one of flying the aircraft, opening an access door to the cockpit area, or opening an access door to a storage compartment.

17. The method of claim 16, wherein attempting to fly the aircraft comprises grasping of a control.

18. The method of claim 17, wherein reading biometric information comprises at least one of reading fingerprints, pulses or retina of the person attempting to fly the aircraft when the person is grasping the control or attempting to open an access door to the cockpit area or storage compartment.

19. The method of claim 18, wherein reading biometric information further comprises reading fingerprints, pulses and retina of the person when the person is grasping the control.

20. The method of claim 17, further comprising restricting function of the control if it is determined that the person is not authorized to fly the aircraft.

21. The method of claim 17, further comprising operating the aircraft in auto pilot mode when an unauthorized person attempts to fly the aircraft.

22. The method of claim 17, further comprising alerting authorities outside of the aircraft when an unauthorized person attempts to fly the aircraft.

23. The method of claim 17, further comprising sending of at least one of biometric information or photograph read from an unauthorized person to authorities outside of the aircraft.

24. The method of claim 17, wherein reading biometric information comprises reading pulses of the person when the person is grasping the control, the method further comprising alerting authorities outside of the aircraft when there is an unusual pulse reading from the person.

25. The method of claim 16, wherein reading biometric information comprises a retina read of the person attempting to fly the aircraft when the person is seated in either a pilot or copilot seat.

26. The method of claim 25, further comprising engaging or disengaging the auto pilot where it is determined that an authorized person is in the pilot or copilot seat.

27. A system for regulating operation of an aircraft during all phases of flight comprising:
means for, prior to each flight, loading biometric information electronically regarding all persons of a designated flight authorized to operate the aircraft;
means for receiving biometric information read by one or more means for reading biometric information from any person attempting to operate the aircraft at any time during all phases of flight; and
means for comparing the received biometric information against the biometric information that was loaded prior to flight to determine whether the person attempting to operate the aircraft at any time during all phases of flight is authorized to operate the aircraft, wherein during all phases of flight comprises the chases of starting up of the aircraft, movement of the aircraft from a fixed position, take-off or landing of the aircraft, taxiing the aircraft as well as in the air flight.

28. The system of claim 27 further comprising means for performing a biometric check of persons authorized to operate the aircraft prior to flight.

29. The system of claim 27, wherein operating comprises at least one of flying the aircraft, opening an access door to the cockpit area, or opening an access door to a storage compartment.

30. The system of claim 29, further comprising a control that is grasped by persons attempting to fly the aircraft.

31. The system of claim 30, wherein the biometric reading means comprises at least one of a fingerprint reader, a pulses reader or a retina reader on at least one of the control or an access door to the cockpit area or a storage compartment.

32. The system of claim 31, wherein the biometric reading means further comprises a fingerprint reader, a pulses reader and a retina reader on at least one of the control or an access door to the cockpit area or a storage compartment.

33. The system of claim 30, further comprising means for restricting function of the control if it is determined that the person is not authorized to fly the aircraft.

34. The system of claim 30, further comprising means for operating the aircraft in auto pilot mode when an unauthorized person attempts to fly the aircraft.

35. The system of claim 30, further comprising means for alerting authorities outside of the aircraft when an unauthorized person attempts to fly the aircraft.

36. The system of claim 30, further comprising means for sending at least one of biometric information or photograph read from an unauthorized person to authorities outside of the aircraft.

37. The system of claim 30, wherein the biometric reading means comprises a pulse reader for reading pulses of the person when the person is grasping the control, the system further comprising means for alerting authorities outside of the aircraft when there is an unusual pulse reading from the person.

38. The system of claim 29, wherein the biometric reading means comprises a retina reader for reading the retina of the person attempting to fly the aircraft when the person is seated in either a pilot or copilot seat.

39. The system of claim 38, further comprising means for engaging or disengaging the auto pilot where it is determined that an authorized person is in the pilot or copilot seat.

40. An aircraft comprising;
a controller operable to fly the aircraft;
one or more biometric devices on the controller reading biometric information from persons attempting to operate the controller to fly the aircraft, at least one of the biometric devices being a fingerprint/pulse reader capable of detecting an irregular pulse that signifies that the person attempting to operate the controller is in a distressed state;
one or more monitoring systems storing biometric information concerning all persons authorized to operate the aircraft the one or more monitoring systems further receiving the read biometric information from the one or more biometric devices and comparing the read biometric information against the stored biometric information of persons authorized to fly the aircraft;
one or more control systems in communication with the one or more monitoring systems to regulate operation of the aircraft during all phases of an aircraft's flight by allowing or disallowing persons to fly the aircraft depending on whether or not an authorized person has been identified, wherein during all phases of flight comprises the phases of starting of the aircraft, movement of the aircraft from a fixed position, take-off or landing of the aircraft, taxiing of the aircraft as well as in the air flight; and
a GPS system in communication with the one or more monitoring systems, the GPS system being configured to send position information to designated locations when an unauthorized person is identified and when the aircraft flies off its normal course.

41. The aircraft of claim 40, wherein the one or more biometric devices comprises a fingerprint reader on the controller of the aircraft.

42. The aircraft of claim 40, wherein the one or more biometric devices comprises a pulse reader on the controller of the aircraft.

43. The aircraft of claim 40, wherein the one or more biometric devices comprises a retina reader on the controller of the aircraft.

44. The aircraft of claim 40, wherein the one or more monitoring systems comprises at least one computer and the one or more biometric devices comprises at least one of a fingerprint reader, a pulse reader or a retina reader.

45. The aircraft of claim 40, wherein the one or more control mechanisms comprises at least one of the auto pilot control system, the controller, aircraft beacon system, a GPS system or any system operated by the controller.

46. The aircraft of claim 40, wherein the one or more control mechanisms comprise devices for restricting the function of the controller if it is determined that a person is not authorized to fly the aircraft.

47. The aircraft of claim 40, wherein the one or more control mechanisms comprises devices for operating the aircraft in auto pilot mode when an unauthorized person attempts to fly the aircraft.

48. The aircraft of claim 40, further comprising devices for alerting authorities outside of the aircraft when an unauthorized person attempts to fly the aircraft.

49. The aircraft of claim 40, further comprising devices for sending at least one of biometric information or photograph read from an unauthorized person to authorities outside of the aircraft.

50. The aircraft of claim 40, wherein the one or more biometric devices comprises a pulse reader for reading pulses of the person when the person is grasping the controller, the system further comprising devices for alerting authorities outside of the aircraft when there is an unusual pulse reading from the person.

51. The aircraft of claim 40, further comprising a retina reader mounted proximate a pilot or copilot seat for reading the retina of the person attempting to fly the aircraft when the person is seated in either the pilot or copilot seat.

52. The aircraft of claim 51, further comprising devices for engaging or disengaging the auto pilot where it is determined that an authorized person is in the pilot or copilot seat.

53. The aircraft of claim 40, further comprising one or more biometric devices associated with at least one of a door to the cockpit area or a door to a storage compartment to restrict access to designated persons.

54. The aircraft of claim 53, wherein the one or more biometric devices comprises a fingerprint reader.

55. The aircraft of claim 53, further comprising a camera mounted on the cockpit area adapted for at least one of taking a retina read of designated persons in response to sensed motion or a photograph of designated persons.

56. The aircraft of claim 55, further comprising devices for transmitting the photograph to authorities outside of the aircraft.

57. The aircraft of claim 40, further comprising an aircraft beacon system in communication with the one or more monitoring systems, wherein an unauthorized person is unable to turn off the aircraft beacon system.

58. A security mechanism of claim 5, wherein the at least one biometric device comprises a fingerprint/pulse reader on the control, and which is contacted by one or more of the pilot's fingers.

59. A security mechanism of claim 6, wherein the at least one computer is located on the aircraft or a location outside of the aircraft.

60. A security system of claim 12, wherein the at least one computer is disposed on the aircraft or a location outside of the aircraft.

61. A security mechanism of claim 1, wherein reading information associated with a user attempting to operate the controller further comprises:
monitoring a user's pulse; and
determining if the user is in a distressed state where there is either an irregular pulse or a rapid pulse.

62. A security mechanism of claim 1, wherein the stored information includes designated permissions assigned to the user.

63. A security mechanism of claim 62, wherein the designated permissions include the ability to turn off and on the aircraft beacon system.

64. A security mechanism of claim 62, wherein the designated permissions include the ability to service the aircraft.

65. A security mechanism of claim 62, wherein the designated permissions correspond to a category of personnel.

66. A security mechanism of claim 65, wherein permission to fly an aircraft is provided to only specific pilots and co-pilots that have been assigned to a particular flight.

67. A security mechanism of claim 1, wherein the stored information for all authorized users is stored prior to flight.

68. A security mechanism of claim 1, wherein a user is restricted from operating the controller until being identified as an authorized user.

69. A security system of claim 13, wherein the GPS system sends the position of the aircraft to designated locations when the aircraft attempts to fly off of a preprogrammed course.

70. The security mechanism of claim 1, wherein the one or more monitoring devices are operable to disable the controller at any time prior to takeoff and at any time during a flight, by comparing the information of the user attempting to operate the controller against the stored information as to all authorized users.

* * * * *

UNITED STATES PATENT AND TRADEMARK OFFICE
CERTIFICATE OF CORRECTION

| | |
|---|---|
| PATENT NO. | : 7,024,023 B2 |
| APPLICATION NO. | : 10/643101 |
| DATED | : April 4, 2006 |
| INVENTOR(S) | : Arnouse |

Page 1 of 1

It is certified that error appears in the above-identified patent and that said Letters Patent is hereby corrected as shown below:

<u>In Column 7</u>

At line 49, please change "flexed" to --fixed--.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,024,023 B2 | Page 1 of 1 |
| APPLICATION NO. | : 10/643101 | |
| DATED | : April 4, 2006 | |
| INVENTOR(S) | : Arnouse | |

It is certified that error appears in the above-identified patent and that said Letters Patent is hereby corrected as shown below:

In Column 6

In claim 7, line 52, please change "mote" to --more--.

In claim 8, line 59, please change "mare" to --more--.

In Column 8

In claim 27, line 44, please change "chases" to --phases--.

Signed and Sealed this

Third Day of March, 2009

JOHN DOLL
*Acting Director of the United States Patent and Trademark Office*